United States Patent [19]

Rupert et al.

[11] 4,361,745
[45] Nov. 30, 1982

[54] PROCESS CONTROL FOR ELECTRICAL DISCHARGE MACHINING APPARATUS

[75] Inventors: Gary F. Rupert, Ann Arbor; Thomas M. Kennedy, Chelsea; John R. MacGregor, Ann Arbor, all of Mich.

[73] Assignee: Raycon Corporation, Ann Arbor, Mich.

[21] Appl. No.: 77,581

[22] Filed: Sep. 21, 1979

[51] Int. Cl.³ .............................................. B23P 1/14
[52] U.S. Cl. ................................ 219/69 G; 219/69 C
[58] Field of Search ...................... 219/69 G, 69 C; 365/229; 364/120, 474, 475

[56] References Cited

U.S. PATENT DOCUMENTS

| | | | |
|---|---|---|---|
| 3,125,700 | 3/1964 | Bentley et al. | 219/69 G |
| 3,370,147 | 2/1968 | Matulaitis | 219/69 G |
| 3,435,176 | 3/1969 | Lobur | 219/69 G |
| 3,435,177 | 3/1969 | Shaffer | 219/69 G |
| 3,525,843 | 8/1970 | Batterson | 219/69 G |
| 3,980,935 | 9/1976 | Worst | 365/229 |
| 4,071,729 | 1/1978 | Bell, Jr. | 219/69 G |
| 4,229,804 | 10/1980 | Kobayashi et al. | 364/474 |

Primary Examiner—C. C. Shaw
Attorney, Agent, or Firm—Olsen and Stephenson

[57] ABSTRACT

A process control system for electrical discharge machining apparatus to control automatically the machining of a workpiece. The process control system is operable to receive and retain a plurality of operation instructions regarding electrical discharge machining parameters and transmit operation commands to the electrical discharge machining apparatus to execute the operation instructions in controlling the complete machining of a workpiece. The process control means includes a storage unit operable to store a plurality of operation instructions enabling absolute repeatability of the machining process defined by the operation instructions in the storage unit for a plurality of workpieces. The process control system also includes a digitally controlled servo system to regulate the movement of the electrode toward and away from the workpiece.

3 Claims, 3 Drawing Figures

PROCESS CONTROL FOR ELECTRICAL DISCHARGE MACHINING APPARATUS

BACKGROUND OF THE INVENTION

The present invention relates generally to electrical discharge machining apparatus, and more particularly, to a process control system for controlling the electrical discharge machining apparatus to perform a complete machining of a workpiece.

Electrical discharge machining apparatus operates to machine an electrically conductive workpiece by causing intermittent electrical discharge across a gap between an electrode and the workpiece. An optimum clearance or working gap must be maintained between the electrode and the workpiece in order to enable the conduction of a suitable machining spark for properly eroding the workpiece. Presently, electrical discharge machining (EDM) apparatus is equipped with various controls which are individually adjusted to establish the various EDM parameters such as the on time for the electrical discharge across the gap, the period of time between electrical discharges, gap voltage, the polarity of the gap voltage and the other EDM parameters which must be controlled in the machining of a workpiece. Moreover, the machining of a single workpiece may require operator intervention at some point prior to the completion of machining to add a parameter which could not be set prior to the initiation of machining.

When the optimum EDM parameters are developed for a particular machining process, the settings on the EDM apparatus are noted and manually recorded. If at a later date the same machining process is employed, the operator refers to the recorded information in setting the controls. At best, this process is time consuming involving recentering steps and prone to human error either in the original recording of the EDM parameter settings of the particular machining process or in the resetting of the EDM apparatus for replicating the original machining process. Accordingly, absolute repeatability of the machining process cannot be assured in this type of EDM system. Additionally, valuable production time is wasted in manually resetting the EDM parameters for the repeat machining of a workpiece.

Another area of EDM processes which can be improved concerns the relatively slow movement of the electrode from a start-rest position to a machining position and the slow retraction of the electrode after machining is completed. In high volume production settings, rapid non-machining movement of the electrode would decrease the machining cycle time with cost savings accruing to the user.

It is the general object of this invention, therefore, to provide a process control system in electrical discharge machining apparatus for retaining operation instructions and controlling the machining of a workpiece in accordance with the operation instructions.

It is another object of the present invention to provide a process control system for an electrical discharge machining apparatus having storage means for retaining a plurality of operation instructions representing the machining of a workpiece to provide the electrical discharge machining apparatus with absolute repeatability in the machining of a plurality of workpieces.

It is another object of the present invention to provide a digitally controlled servo system and gap-sensing system cooperating to provide for an initial rapid advance of the electrode toward the workpiece and in response to the detection of the first electrical discharge across the gap to reduce the rate of electrode advancement to a slower feed rate.

SUMMARY OF THE INVENTION

In accordance with the present invention, an electrical discharge machining generator is provided being controlled by process control means including a microprocessor capable of receiving a plurality of operation instructions regarding EDM parameters and issuing operation commands to execute the operation instructions to control the machining of a workpiece. The process control means receives operation instructions regarding EDM parameters such as the on time for an electrical discharge (machining spark), the time period between sparks, the current level, and other EDM-related parameters. These operation instructions are acted upon by the microprocessor to control the EDM power supply. The microprocessor continuously monitors the operation of the apparatus and issues the appropriate operation commands needed to complete a machining process on a workpiece. For instance, the microprocessor controls the pulse timer and control logic circuits generating the appropriate logic pulse which drives the power output circuits at the appropriate power level and polarity which also are established as a result of the operation instructions having been inputted in the microprocessor.

The process control means also includes a plug-in EDM parameter memory unit which can store a plurality of operation instructions representing the machining of a workpiece. When the plug-in EDM parameter memory is connected to the process control means, the operation instructions stored in the memory unit are inputted into the microprocessor which controls machining. The absolute repeatability of a machining process using the operating instructions stored in the EDM parameter memory unit assures consistently machined workpieces.

The process control means of this invention also incorporates gap sensing circuits and a digitally controlled servo system. The gap-sensing circuits sense electrical conditions present at the working gap and provide status signals to the microprocessor to control subsequent machining sparks and to control the servo system for control of the movement of the electrode. The gap-sensing circuits and the servo system cooperate when machining is initiated to advance the electrode toward the workpiece at a rapid rate. When the gap-sensing circuits detect the first machining spark across the working gap, the servo system is switched to a slower feed rate at which machining is carried out.

Further objects, features, and advantages of the present invention will become apparent from a consideration of the following description when taken in connection with the appended claims and the accompanying drawing in which:

Figure 1:
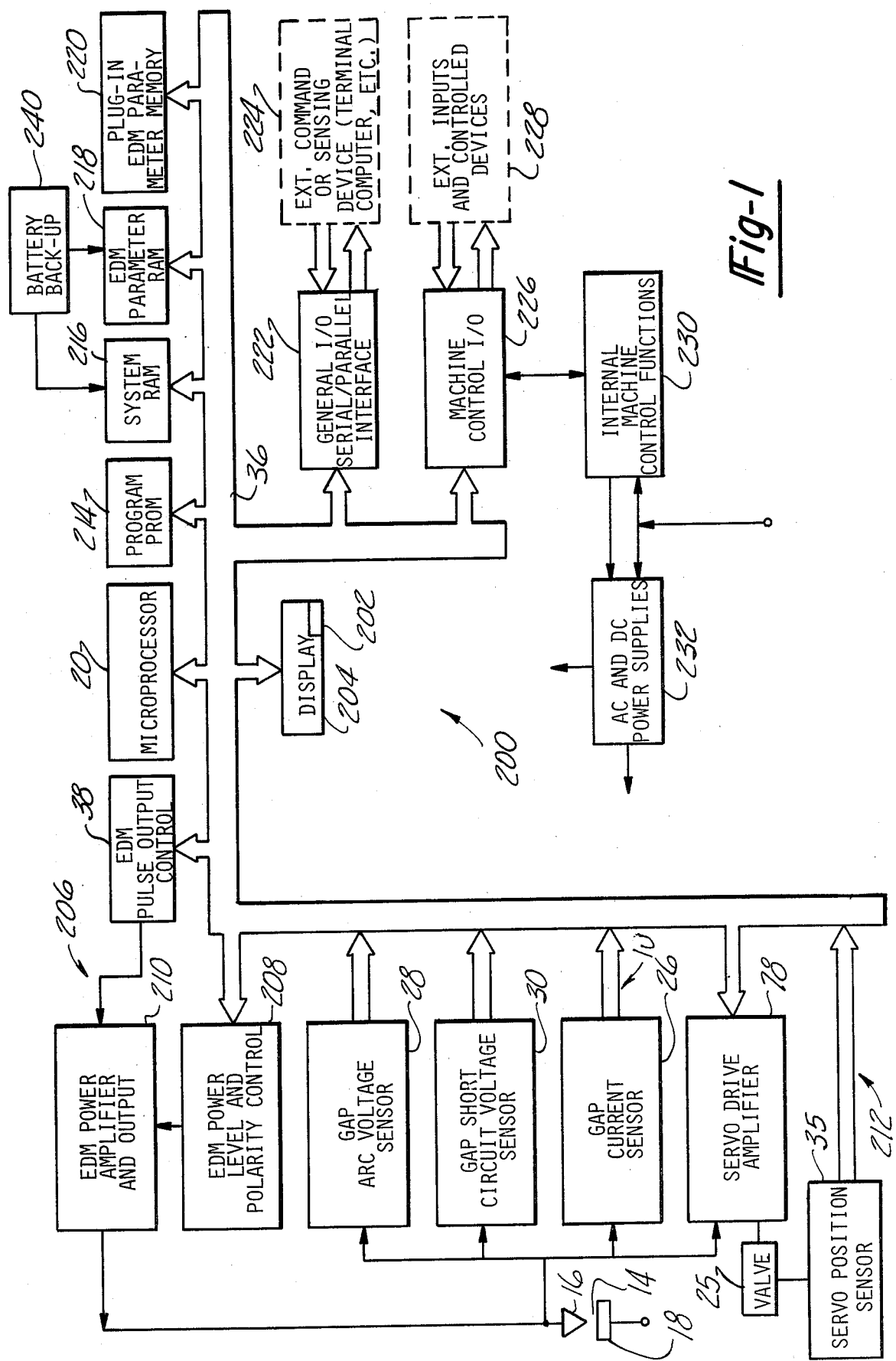
FIG. 1 is a block diagram of the process control system of the present invention incorporated in an electrical discharge machining apparatus.

With reference to the drawing, the process control system of this invention, illustrated generally at 200, is shown in FIG. 1 incorporated in an electrical discharge machining apparatus which operates to machine a workpiece 18 by causing intermittent electrical discharge (machining spark) across a gap 14 between an electrode 16 and the workpiece 18.

The machining of the workpiece 18 is controlled by a microprocessor 20 operable to receive operation instructions regarding the parameters of the EDM process and issue appropriate commands needed to implement the EDM process to complete the machining of the workpiece 18. The operation instructions are inputted into the microprocessor 20 through a keyboard 202 positioned adjacent a display 204 which provides indicia as to the operation instructions being executed and as to various conditions that are being monitored.

The microprocessor 20 controls all EDM parameters necessary to complete the machining of the workpiece 18. These parameters include, for example, the time limit for one or more operation instructions to be carried out, the period of time that the EDM machining spark will be on during normal operation, the period of time between machining sparks, the current level of the machining spark, the gap voltage at which arcing is detected, the period of time in response to the detection of arcing that the pulse generation is suppressed, the detection of a short circuit, the length of time after a short circuit is detected that the pulse generation is cut off, the gap voltage of the working gap that is to be maintained, its polarity, and the rate at which the electrode is to be moved to maintain the preset gap voltage. All of these parameters, plus any additional parameters required to complete the machining process, are inputted into the microprocessor 20 in the form of operation instructions.

The electrical discharge machining apparatus includes a power supply system 206 consisting of power level and polarity control circuits 208 controlled by the microprocessor to provide for the desired amount and direction of current flow across the gap 14. The power supply 206 further includes power amplifier and output circuitry 210 consisting of power cards that amplify the output of the EDM pulse output control logic 38 which converts machining spark-related operation commands from the microprocessor 20, such as on time and off time for the machining sparks. The microprocessor 20 therefor controls the EDM generator to generate the appropriate machining sparks with the desired parameters needed for completing the machining operation.

The electrical discharge machining apparatus also incorporates a digitally controlled servo system 212 consisting of a servo position sensor 35 which can take the form of a limit switch or a device for measuring actual depth readings of a hole being machined in the workpiece upon which the microprocessor 20 can act. In response to a signal from the servo position sensor 34, the microprocessor 20 can terminate the cycle or execute a new set of operation instructions. The servo system 212 also includes a valve 25 which is the prime mover of the electrode 16 and controls its advancement and retraction from the workpiece. A DC motor or a stepping motor can readily be substituted for the servo valve 25 to control movement of the electrode 16. A servo drive amplifier 78 controls the valve 25 in such a manner to maintain a predetermined gap voltage across the gap 14 during normal machining. The servo drive amplifier 78 is responsive to the microprocessor 20 and cooperates with gap-sensing and electrode feed and retract means 10 to provide for the rapid advancement of the electrode 16 toward the workpiece 18 when the machining cycle is initiated and when the initial machining spark is detected by one of three sensing circuits, the rate of advancement of the electrode 16 is reduced by the servo drive system 212 to a slower machining feed rate.

The gap-sensing means 10 includes a gap current sensor 26, a gap short circuit voltage sensor 30, and a gap arc voltage sensor 32. Operation of the servo drive system 212 in connection with the gap-sensing and electrode feed and retract system 10 will be explained in greater detail below. For the present purposes, however, the gap-sensing circuits 26, 30, and 32 monitor the electrical condition of the gap 14 and provide signals to the microprocessor 20 which, in response thereto, causes the digital servo system 212 to move the electrode 16 in such a manner to maintain a predetermined gap voltage across the gap 14.

The process control means 200 includes a program Prom 214 which contains the program executed by the microprocessor 20. A system Ram 216, also controlled by the microprocessor 20, contains pertinent information about the gap 14, EDM operation instructions, and control information for the electrical discharge machining apparatus. An EDM parameter Ram 28 is used for storage of EDM operation instructions regarding EDM sequence parameters. These operation instructions are transmitted to and from the microprocessor 20 by a data bus 36.

An important feature of the present invention is the implementation of a plug-in memory unit 220 which is used for storage of a plurality of operation instructions regarding the complete machining of a workpiece 18. The information in the memory unit 220 can be transferred to the EDM parameter Ram 218 making the operation instructions available to the microprocessor 20 for control of the machining of a workpiece. Similarly, the information in the EDM parameter Ram 218 can be transferred to the EDM parameter memory 220 for storage. The plug-in EDM parameter memory 220 forms a removable storage or memory means which provides the electrode discharge machining apparatus with absolute repeatability in the machining of a plurality of workpieces. Accordingly, a workpiece may be machined at a later date in accordance with the program or operation instructions contained in the EDM parameter memory 220 with complete assurance that exact replication of the machining process will occur.

A general input/output interface 222, consisting of an EIA RS-232C serial interface, is a general interface used to interface external controls 224 such as a computer or a terminal device which allows an additional access to the microprocessor 20. A machine control input/output module 226 provides an interface with external devices 228 such as switches, etc., which allows the microprocessor 20 to control these external devices or which is responsive to signals generated by such external devices. An internal machine control 230 is used to enable the EDM process and to call for a stop in the cycle when certain conditions occur. Power supplies 232 provide all the power for the logic and EDM output and form a primary source of power.

The system Ram 216 and the EDM parameter RAM 218 are connected to a memory-protect system which provides an auxiliary back-up power source 240 should an interruption in power from the primary power source 232 occur. The auxiliary power source 240 consists of a battery connectable automatically to the system Ram 216 and the EDM parameter Ram 218 in the event of a power interruption to protect and retain the operation instructions in the system.

Figure 2:
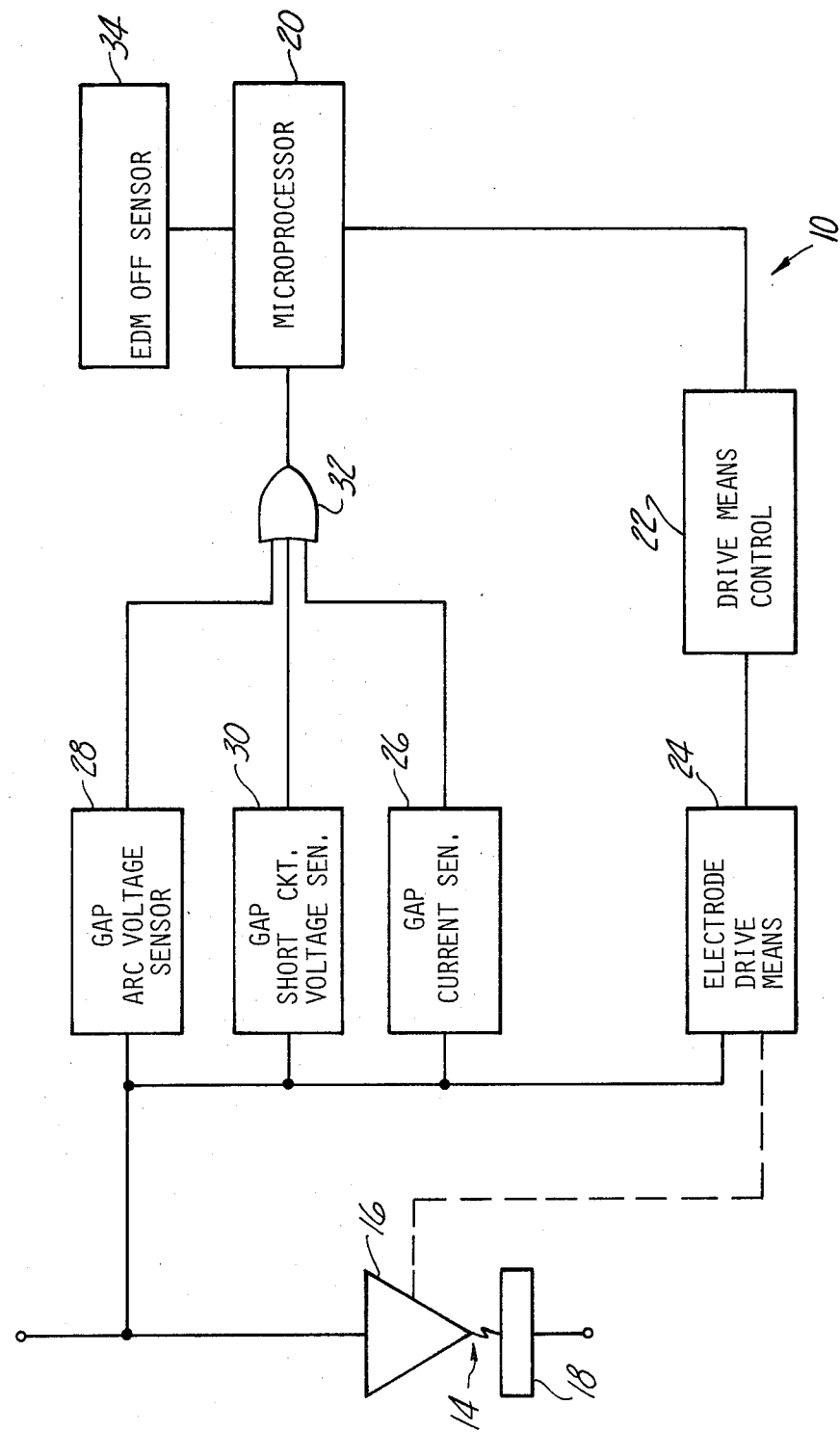
FIG. 2 is a block diagram showing the gap-sensing and servo control system of this invention for controlling the advancement and retraction of an electrode.

The electrode feed and retract system 10 includes the microprocessor 20 which is programmed to control a drive means control 22 that in turn controls electrode drive means 24 to advance and retract the electrode 16. The electrode drive means 24 comprises the servo valve 25, as shown in FIG. 2, which controls a hydraulic system for advancing and retracting the electrode 16. The microprocessor 20 is programmed initially to transmit the appropriate signals to the drive means control 22 to cause the electrode 16 to be advanced at a rapid rate of travel. When the first spark is generated, the microprocessor 20 receives a predetermined signal indicating the electrode 16 is in close proximity with the workpiece 18 at a position where machining can be initiated, it will generate the appropriate signals notifying the drive means control 22 to cause the electrode drive means 24 to change the rate of travel of the electrode 16 from its fast rate to a slower machining rate to machine the workpiece 18. The drive means control 22 is further operable as the machining of the workpiece 18 proceeds to maintain the working gap 14 at a predetermined gap distance between the electrode 16 and the workpiece 18 which is determined by the parameters entered into the microprocessor 20.

The predetermined signal upon which the microprocessor 20 acts to cause the rate of electrode advancement to change from a rapid rate to a slower machining feed rate is generated by one of three sensing circuits 26, 28, or 30. Each sensing circuit operates to detect a predetermined electrical condition across the gap 14 which indicates that the electrode 16 is in close proximity to the workpiece 18. This predetermined electrical condition can be either a predetermined change in the voltage or a predetermined change in current conduction across the gap 14.

The gap current sensor 26 operates to sense the initial flow of current across the gap 14 (the first machining spark) and then to generate a current signal that is applied through an OR gate 32 to the microprocessor 20 which responds to this signal by signaling the drive means control 22 to control the electrode drive means 24 to cause the rate of electrode advancement to be slowed from the rapid rate to the slower feed rate.

The gap arc voltage sensor 28 senses a voltage below a predetermined value which indicates an arcing condition. Generally, the electrical discharge across the gap 14 takes on an arcing characteristic when the electrode 16 is moved too close to the workpiece 18, thus decreasing the gap voltage. Arcing does not provide a suitable machining spark and this condition must be corrected. Nevertheless, a sensing of a gap voltage indicative of arcing upon initial advancement of the electrode 16 also shows that the electrode 16 is near the workpiece 18. In response to the sensing of the existence of an arcing voltage, the gap arc voltage sensor 28 transmits a signal through the OR gate 32 to the microprocessor 20 causing the microprocessor 20 to signal the drive control means 22 to provide for the change of rate of electrode travel from a fast to a feed rate.

The gap short circuit voltage sensor 30 is set to detect a gap voltage at or below a defined voltage value that represents a short circuit condition between the electrode 16 and the workpiece 18. When this voltage is sensed, the gap short circuit sensor 30 generates a signal that is transmitted through the gate 32 to the microprocessor 20 to cause the advancement of the electrode 16 to be slowed to its feed rate slow. A short circuit may be defined at some voltage of a low value which may or may not be a zero voltage level. At any rate, once the short circuit sensor 30 detects a gap voltage below a predetermined value, it will generate a current signal that is transmitted to the microprocessor 20.

The use of the sensing circuits 26, 28, and 30 provide a fail-safe sensing means. Since only operation of one of the sensing circuits 26, 28, or 30 will cause the microprocessor 30 to signal the drive control means 22 to slow the rate of electrode advancement, failure of one or two of the sensing circuits will not affect the operation of the system 10.

An EDM off sensor 34 is connected to the microprocessor 20 and operates to signal the microprocessor 20 when machining of the workpiece 18 is completed. The EDM off sensor can take the form of a limit switch (not shown), for example, which detects a forward limit of movement of the electrode 16 indicating that machining is completed and which then generates a signal that is transmitted to the microprocessor 20 which in response thereto causes the electrode drive means control 22 to retract the electrode 16 at a rapid rate to its start-rest position. The EDM off sensor may take other forms such as a timer which generates a retract signal when it has timed out.

Figure 3:
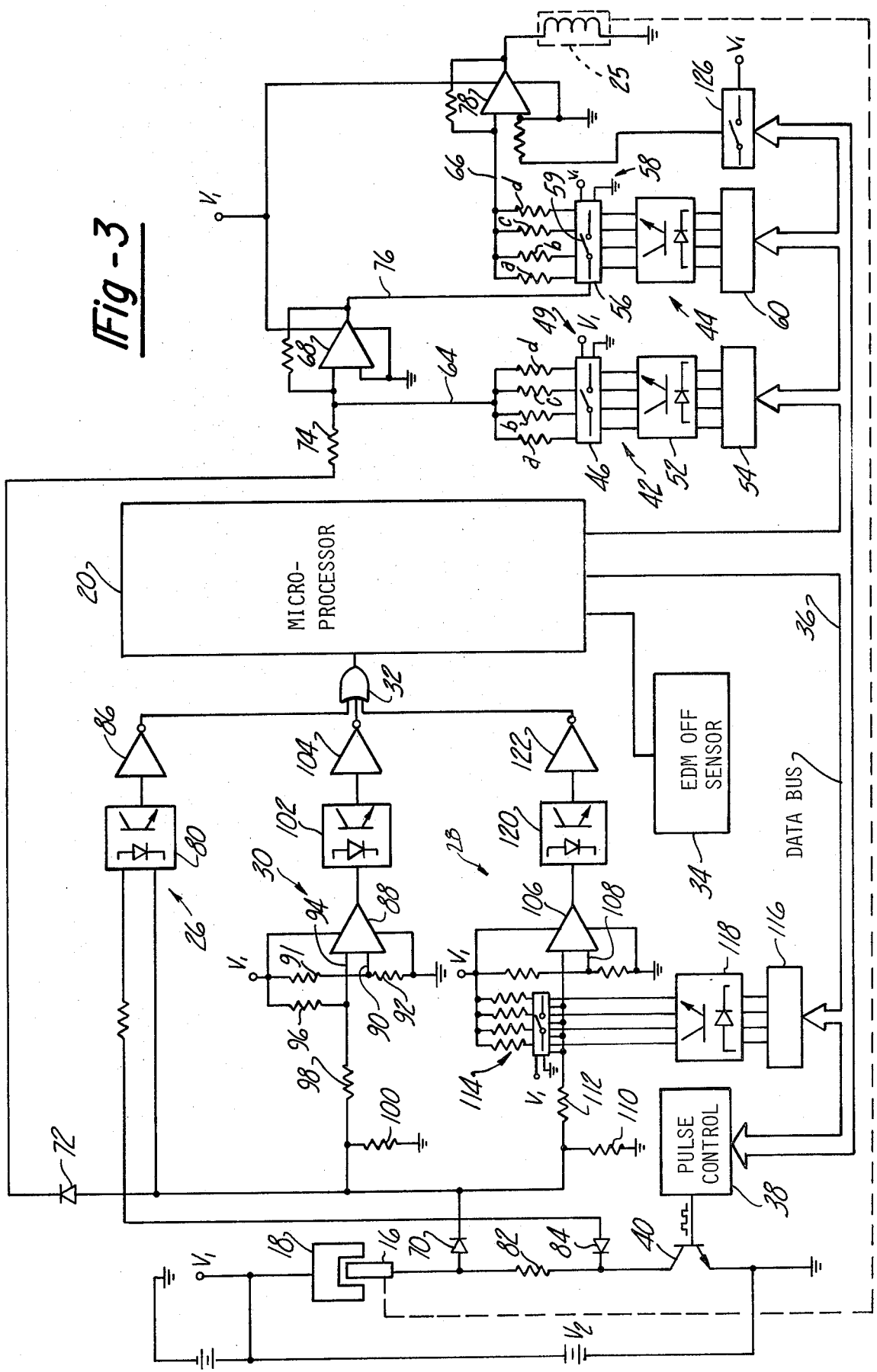
FIG. 3 is a detailed schematic diagram of the block diagram shown in FIG. 1 illustrating the circuits employed in the gap-sensing circuit and the servo system for controlling the movement of the electrode.

The feed and retract system 10 is shown in greater detail in FIG. 3. The microprocessor 20 is programmed to perform a variety of functions. For instance, it is programmed to transmit information on the data bus 36 to a power pulse control circuit 38 to control operation of the switching transistor 40 to switch the transistor on and off with a selected rate and with a pulse duration that is suitable for the particular workpiece being machined. The microprocessor 20 is also programmed to signal the drive control means 22 to control the rate of advancement of the electrode 16, to establish the desired working gap 14 between the electrodes 16 and the workpiece 18, and to provide for the rapid retract of the electrode 16 from the workpiece 18 to its start-rest position.

The drive means control 22 includes a servo control circuit 42 and a response control circuit 44. The servo control circuit 42 establishes the gap voltage that is to be maintained and the response control circuit 42 controls the rate at which the electrode 16 is moved to attain the desired gap voltage. The servo circuit 42 comprises an analog-switching device 46 having resistors a, b, c, and d connectable to a working voltage $V_1$ at 49 by an associated one of four switches (one shown diagrammatically).

The switches of the analog switching device 46 are opened and closed by light couplers 52 (one shown diagrammatically) which in turn are activated by the latch 54 which receives the appropriate signals from the microprocessor 20 through the data bus 36.

The response control circuit 44 includes an analog switch device 56 having resistors a, b, c, and d connectable to a working voltage $V_1$ at 58 by opening and closing the switches 59 as a result of activation and deactivation of the light couplers 60 which are controlled by the microprocessor 20 through the latch 62. In effect, the analog switches 46 and 56 are digital equivalents of a potentiometer with the voltage on their output lines 64 and 66 being dependent upon the array of resistors connected to the working voltages of the switches 46 and 56.

The drive control means 22 further includes an amplifier 68 to which the gap voltage is applied by means of the diodes 70 and 72 and a resistor 74. The output voltage of the servo control circuit 42 is applied the amplifier 68 through the line 64 and is of a polarity opposite the polarity of the gap voltage. Thus when the gap voltage is different from the voltage output of the servo control circuit 42, the amplifier 68 will output a voltage level whose polarity depends upon whether the gap voltage is greater or less than the voltage output of the servo control circuit 42.

The output of the amplifier 68 is transmitted via line 76 to the analog switch 56 which is operable to increase or supress the output of the amplifier 68 depending on the combination of resistors 56a-d that are employed. The output of the response control circuit 44 is transmitted on the line 66 to an amplifier 78 which controls the servo valve 25 to advance and retract the electrode 16. Essentially, the drive control means 22 is an error circuit which causes the electrode 16 to be moved in a manner maintaining a predetermined gap voltage and therefore gap distance between the electrode 16 and the workpiece 18.

The gap current sensor 26 comprises a light coupler 80 connected across the load resistor 82 through the diode 70 and the diode 84. A portion of the current conduction that crosses the gap 14 will be fed through the diode 70 into the light coupler 80 which turns on a buffer 86 that provides a current output to the microprocessor 20 notifying it that the electrode 16 is close to the workpiece 18 and that the rate of electrode advancement is to be changed from a rapid rate to the slower feed rate.

The gap short circuit voltage sensor 30 includes a comparator 88 having an input 90 to which a reference voltage determined by the voltage $V_1$ and the voltage divider consisting of the resistors 91 and 92 is applied. This reference voltage has a value such that if the gap voltage falls below it, a short condition exists. The gap voltage is applied to the other input 94 of the comparator 88 through the diode 70 and is scaled and divided by the resistors 96, 98, and 100. When the scaled, divided gap voltage falls below the reference voltage, the comparator 88 produces a current output to a light coupler 102 which turns on a buffer 104 to transmit a current signal to the microprocessor 20 which responds to cause the rate of advancement of the electrode 16 to be changed to the feed rate.

The arc voltage sensor 28 is similar to the short circuit sensor 30 having a comparator 106 with one input 108 to which a reference voltage is applied. The gap voltage is scaled and divided by the resistors 110 and 112 and its level is adjusted by an analog switch 114 controlled by the microprocessor 20 through a latch 116 and the light coupler 118. Thus, the value at which the comparator 106 triggers the light coupler 120 and the buffer 122 can be varied and controlled by the microprocessor 20. In use, the analog switch 114 will be set so that the microprocessor 20 is notified of an arc voltage that is greater than the short circuit voltage, but less than the normal machining voltage.

In operation, assume that at the onset of the EDM operation, the microprocessor 20 will set the analog switching devices 46 and 56 to provide for the fast rate of feed of the electrode 16 toward the workpiece 18. Assume also that the voltage across the gap 14 has a maximum value of 80 volts and that the machining voltage is to be 30 volts. The gap voltage is applied through the line 68 to the amplifier 66 and when the electrode 16 is in its start-rest position, the voltage drop across the gap will be at its maximum. With the voltage output of the servo control circuit being of a polarity opposite to the polarity of the gap voltage, the maximum rate of travel will occur when the output of the analog switch 46 is zero volts. Similarly, the response control circuit 44 is set to provide for the maximum or near maximum gain of the output of the amplifier 68. When the operator initiates machining, the large error signal applied to the amplifier 68 causes the gain of its output to be increased by the response control current 44 which in turn causes the amplifier 78 to activate the servo valve 25 to provide for the rapid advancement of the electrode 16.

When the electrode 16 is in close relationship with the workpiece 18 and the first spark crosses the gap 14, one of the circuits 26, 28, or 30 will sense the close position of the electrode 16 to the workpiece 18 and generate a signal that is transmitted to the microprocessor 20 which responds by resetting the analog switches 46 and 56 through the data bus 36, the latches 54 and 66 and the light couplers 52 and 60 to continue machining at a slower feed rate.

As mentioned previously, the microprocessor 20 controls the analog switch device 46 to supply a 30 volt output on the line 64 after the first spark is sensed; the amplifier 68 produces an output only when the gap voltage either is less than or exceeds the 30 volt level. If the gap voltage exceeds the 30 volt output level of the servo control circuit 42, the amplifier 66 produces an output that is applied to the analog switch device 56 which is set by the microprocessor 20 to provide a predetermined gain of the output of the amplifier 68 to the amplifier 78 which determines the rate at which the servo valve 24 operates to move the electrode 16 to a position in which the gap voltage across the gap 14 equals the voltage on the output 64. If the gap voltage is less than the 30 volts on the line 64, a negative voltage (opposite in polarity to the gap voltage) will be applied to the amplifier 68 whose output will have its gain adjusted by the analog switch device 56 and applied to the amplifier 70 to retract the electrode slightly from the workpiece 18. In other words, the servo control circuit 42 is set to establish the working gap between the workpiece 18 and the electrode 16 while the response control circuit 44 determines the rate at which the electrode 16 is moved to achieve the desired gap voltage and therefore the desired working gap distance. In other words, both the advancement and retraction of the electrode 16 is adjusted to maintain the desired working gap.

When machining is completed, the microprocessor 20, upon receipt of a signal from the EDM off sensor 34, closes a switch 126 connecting a voltage V to the amplifier 78 which causes the servo valve 25 to operate in a manner to retract the electrode at a rapid rate. The voltage V on the switch 126 has a polarity opposite to the gap voltage and is sufficiently large to override any voltage that may be generated by the response control circuit 44 that advances the electrode 16.

The process control means 200 also includes code lock means in which the keyboard 202 can be locked and unlocked by inputting selected coded lock and unlock instructions. Thus, when the coded lock instruction is inputted into the microprocessor 20, further operation instructions are not accepted by the process control means 200. This feature proves advantageous in production settings to eliminate the possibility of an unauthorized modification of a program that has been developed and inputted to machine a workpiece. Only after the coded unlock instruction has been inputted will the process control means 200 be capable of receiving further operation instructions.

The process control means 200 is operable to receive operation instructions while executing other operation instructions to machine a workpiece 18. Thus, if it is determined during the machining of a workpiece that a subsequent operation instruction need be modified, or an additional operation instruction need be included, this information can be inputted without interrupting the machining of the workpiece. Consequently, valuable production time is not lost.

As can be seen from the above description, an improved electrical discharge machining generator is provided utilizing the microprocessor 20 to execute a plurality of operation instructions to machine a workpiece. The microprocessor 20 allows a complete program of machining instructions to be inputted which are acted upon by the microprocessor 20 to control the various electrical discharge machining parameters. The process control system 20 employs the plug-in EDM parameter memory unit 220 which stores a plurality of operation instructions representing a part program to provide absolute repeatability of the machining process. The process control system 200 is extremely reliable and reduces the need for operator intervention in the machining of a workpiece once the EDM parameters are established and inputted, and reduces production time. The present invention also provides for the rapid advancement of the electrode 16 toward the workpiece 18, an electrical sensing of the first spark generated which is indicative of the close proximity of the electrode 16 to the workpiece 18 that causes the electrode drive means 20 to change the rate of advancement from rapid to a slower feed rate machining at the slower feed rate and, upon completion of machining, providing for the rapid retraction of the electrode.

What is claimed:

1. In electrical discharge machining apparatus for machining a workpiece with an electrode by causing intermittent electrical discharge across a gap between said electrode and said workpiece, said apparatus comprising drive means operable to advance and retract the electrode with respect to the workpiece, a power supply for supplying the electrical discharge across said gap, a microprocessor control system for controlling both the electrical discharge from said power supply and the relative positioning of said electrode by said drive means with respect to said workpiece, and means sensing the voltage and current across said gap, the improvement which comprises an amplifier stage (78) supplying a control current for control of the drive means, an input circuit (44) associated with said amplifier stage (78), said input circuit (44) comprising a resistor network having an effective value controlled by a digital output (60) of the microprocessor representing a desired feed rate for the electrode, a second amplifier stage (68), said second amplifier stage (68) comprising means (70, 72, 74) receiving one analog input signal representative of actual gap voltage and an input circuit (42) comprising a further resistor network having an effective resistance controlled by a digital output (54) of the microprocessor representing a desired gap voltage, the second amplifier stage having an output (76) connected as another input to the first amplifier stage (78).

2. The improvement set forth in claim 1, wherein a controlled switch (126) also is associated with the first amplifier stage and the controlled switch (126) is actuated by the microprocessor on completion of the machining of the workpiece to cause retraction of the electrode from the workpiece.

3. The improvement set forth in claim 1, including a gap sensor circuit (26) which monitors the gap and provides a signal when a predetermined gap current is sensed, a short circuit sensor circuit (30) responsive to the gap current to provide a signal in event of a short circuit condition, a gap arc voltage sensor circuit (28) which monitors the gap and provides a signal in event of gap arcing, said gap arcing circuit having the gap threshhold set from the microprocessor, and said three sensor circuits being operably coupled through a logic circuit such that occurrence of a signal from any one of said three sensor circuits causes the microprocessor to effect a change in the rate of the drive means.

* * * * *